US005341423A

United States Patent [19]

Nossen

[11] Patent Number: 5,341,423

[45] Date of Patent: Aug. 23, 1994

[54] MASKED DATA TRANSMISSION SYSTEM

[75] Inventor: Edward J. Nossen, Cherry Hill, N.J.

[73] Assignee: General Electric Company, Philadelphia, Pa.

[21] Appl. No.: 12,088

[22] Filed: Feb. 6, 1987

[51] Int. Cl.[5] .............................................. H04L 9/00

[52] U.S. Cl. .......................................... 380/6; 380/34; 375/1

[58] Field of Search ........................... 380/6, 8, 33, 34; 375/1

[56] References Cited

U.S. PATENT DOCUMENTS

| | | | |
|---|---|---|---|
| 2,230,243 | 2/1941 | Haffcke | 380/6 |
| 2,476,337 | 7/1949 | Varian | 380/8 |
| 2,582,968 | 1/1952 | Deloraine et al. | 380/6 |
| 4,397,034 | 8/1983 | Cox et al. | 380/6 |
| 4,612,669 | 9/1986 | Nossen | 455/123 |
| 4,652,838 | 3/1987 | Nossen | 380/6 |
| 4,669,091 | 5/1987 | Nossen | 375/14 |

*Primary Examiner*—Salvatore Cangialosi
*Attorney, Agent, or Firm*—William H. Meise; Geoffrey H. Krauss

[57] ABSTRACT

A method and apparatus for masking the presence and content of data transmissions includes a mobile transmitter which encodes the data by means of a pseudorandom spreading (PRS) code having a chip rate, and which transmits it at a carrier frequency. A masking transmitter remote from the mobile transmitter encodes a carrier at the same frequency with a second PRS sequence having the same chip rate, and transmits it at a power level higher than the power level of the mobile transmitter. A signal interceptor cannot separate the mobile and masking station carriers on a frequency basis. The relatively low-power mobile station PRS signal is difficult to detect in the presence of the high-power masking station code. The intended receiver (master station) receives an ensemble signal which is principally masking station signal. The master station regenerates the known masking station PRS code and subtracts it from the ensemble signal to leave a residue signal which contains the data-bearing mobile station PRS signal. The data in the mobile station PRS signal is recovered in conventional manner by use of a regenerated mobile station PRS signal. The master station may also control the relative amplitudes of the carriers transmitted by the mobile and masking station, as well as their chip rates.

15 Claims, 11 Drawing Sheets

MASKED DATA TRANSMISSION SYSTEM

The Government has rights in this invention pursuant to Subcontract No. GM6353 under Contract No. F04704-85-C-0106 awarded by the Department of the Air Force.

This invention relates to a communications system in which data transmissions from a first transmitter are masked by transmissions from a masking or decoy transmitter.

BACKGROUND OF THE INVENTION

Some government operations have historically depended upon the element of surprise, but modern operations often require two-way data transmissions among operating units. Such transmissions if detected can reveal the location of the transmitter. If the transmissions can be decoded, other important information may be compromised. It is therefore important to prevent detection or localization of personnel and vehicles by monitoring of their electromagnetic data transmissions. Many techniques have been advanced to make interception of communications difficult. For example, spread-spectrum techniques such as frequency hopping and direct sequence spreading reduce the average transmitted power in a given bandwidth to make interception difficult. The phase of a carrier can be randomized as described in U.S. patent application Ser. No. 724,309 filed Apr. 12, 1985, now U.S. Pat. No. 4,652,838 in the name of Nossen, to reduce the detected power density. It is often desirable to combine two or more communication techniques in order to further increase the difficulty of receiving a transmitted signal or of decoding the information contained therein. Thus, it is advantageous to have many techniques for preventing the reception of transmissions, for preventing the decoding of the information contained therein if the transmissions are received, or both.

SUMMARY OF THE INVENTION

A method and apparatus for transmitting data and for masking the transmission of data so transmitted includes a phase modulator for phase modulating a first pseudorandom sequence with the data to be transmitted to produce a phase modulated PRS signal, and also includes a first modulator for modulating first carrier signal with the phase modulated PRS signal to produce first modulated carrier signal having a first frequency characteristic. Modulated carrier signal is transmitted from a first site to produce a transmitted data signal, which it is desired to mask to aid in preventing unauthorized reception. A second pseudorandom sequence generator generates a second pseudorandom sequence which may be orthogonal to the first pseudorandom sequence. A second modulator modulates the second carrier signal by means of the second pseudorandom sequence to produce second modulated carrier signal, which has the first frequency characteristic. A second transmitter transmits the second modulated carrier signal from a second site to produce a transmitted masking signal. A receiver at a third site receives an ensemble signal which includes the data signal and the masking signal, and processes the ensemble signal to generate an ensemble signal including received phase modulated PRS signal and received second pseudorandom sequence. At the third site, a third pseudorandom sequence generating arrangement generates replicas of the first and second pseudorandom sequences. An arrangement is provided to control the phase and amplitude of the replica of the second pseudorandom sequence to equal the phase and amplitude of the received second pseudorandom sequence to produce a phase controlled second PRS signal. A subtractor subtracts the phase controlled PRS signal from the demodulated ensemble signal to produce a residue signal which contains the received phase modulated PRS signal. A multiplier multiplies the residue signal by a replica of the first pseudorandom signal to obtain the desired data. In one embodiment, a chip rate controlling arrangement is provided for controlling the first and second chip rates of the first and the second pseudorandom sequences to be equal. In accordance with a particularly advantageous embodiment of the invention, the relative amplitudes of the transmitted first signal and the transmitted masking signal are adjusted relative to each other to make unauthorized reception of the data difficult, while still allowing the authorized receiver to recover the data.

DETAILED DESCRIPTION OF THE INVENTION

Figure 1:
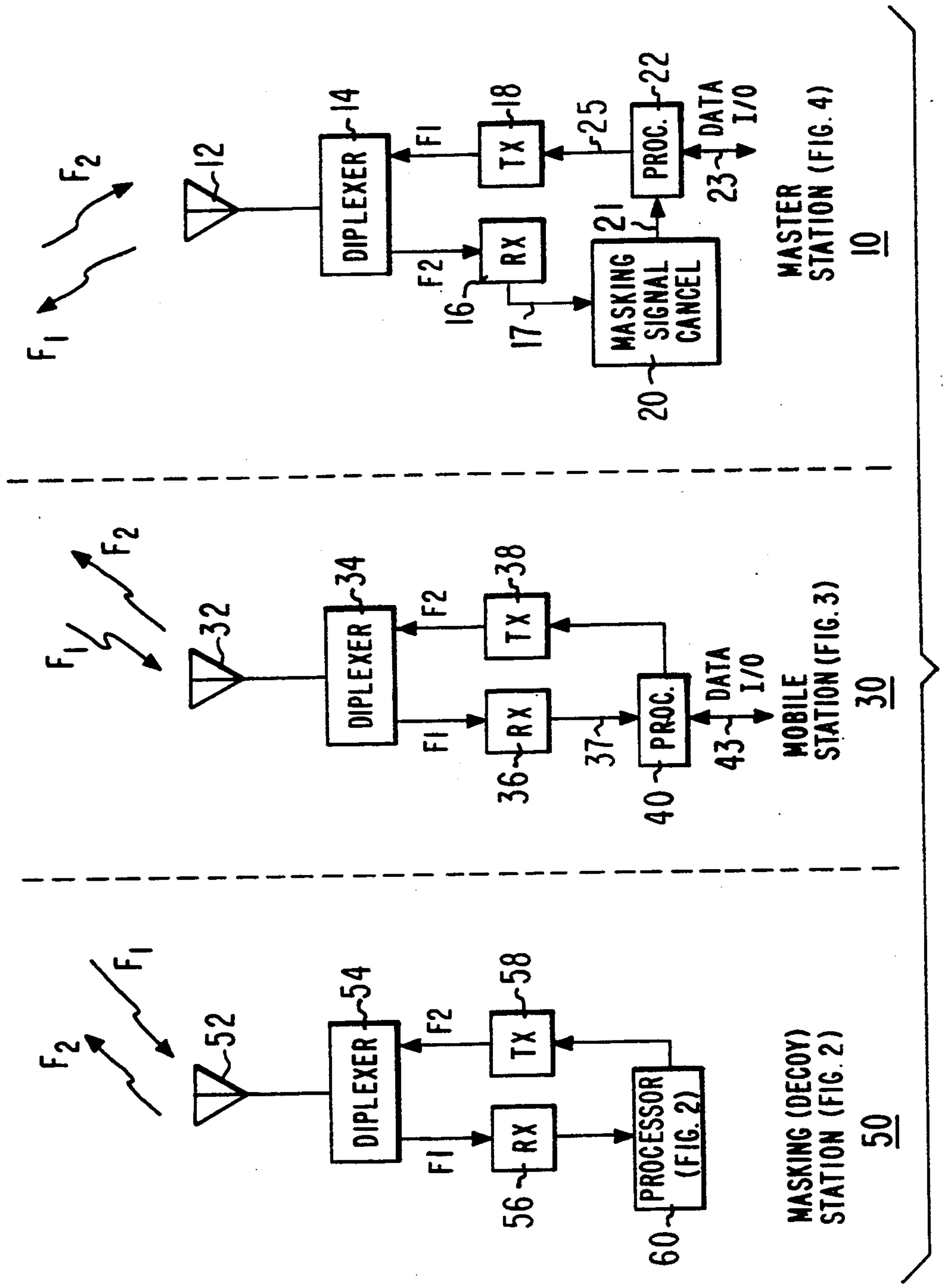
FIG. 1 is a block diagram of a portion of a communication system according to the invention, illustrating a master station or transmitter-receiver, one mobile station and one masking or decoy station.

FIG. 1 is a block diagram of a portion of a communication system according to the invention. The communication system includes a master station or master transmitter-receiver designated generally as 10, one or more mobile stations, one of which is illustrated as station 30, and one or more masking or decoy stations, one of which is illustrated as station 50. Master station or base station 10 transmits to the mobile and masking stations signals at a frequency $F_1$, which transmissions include data and also include information relating to operation of the masking system, such as time-of-day (TOD) and transmission amplitude commands. Mobile station 30 receives data at frequency $F_1$ from master station 10 and possibly from other mobile stations, and makes the received data available at a data input-output (I/O) port, and also receives TOD and amplitude commands (also at frequency $F_1$) from master station 10. Data applied to the I/O port of mobile station 30 is transmitted at frequency $F_2$ for reception by master station 10 and possibly by other mobile stations. The transmissions by mobile station 30 are ordinarily short bursts. Masking station 50 receives signals at frequency $F_1$ from master station 10 and uses the information (control signals) relating to the operation of the masking system but does not ordinarily need to decode data. In response to the control signals, masking station 50 transmits continuously at frequency $F_2$ in such a fashion that the burst transmissions by mobile station 30 and by other mobile stations (not illustrated) are masked. Frequencies $F_1$ and $F_2$ may be the center frequencies of a band of frequencies generated by a pseudorandom spreading code, or may be a family of frequencies which are hopped among according to a pseudorandom sequence (PRS).

Master station 10 as illustrated in FIG. 1 includes an antenna 12 and a frequency diplexer 14. Diplexer 14 couples signals received by antenna 12 at frequency $F_2$ to a receiver (Rx) 16, and accepts signals at frequency $F_1$ from a transmitter (Tx) 18 for application to antenna 12. The signals received at frequency $F_2$ are processed and demodulated in receiver 16, as for example by downconverting to an IF frequency, and the signals so processed are applied over a conductor 17 to a masking signal cancelling arrangement illustrated as a block 20 to unmask the mobile station data signal. The masked and unmasked data signals are applied from cancelling arrangement 20 by way of conductor 21 to a processing block 22 which demodulates the unmasked signal originating from mobile station 30, and which also notes the relative amplitudes of the data and masking signals, and generates instructions for transmission to mobile station 30 and masking station 50 for control of the amplitudes and possibly the phases their signals. Processor 22 also receives data at a data I/O port from conductor 23 for transmission to the mobile stations, processes it for transmission and applies it over a conductor 25 to a transmitter 18.

Mobile station 30 as illustrated in FIG. 1 includes an antenna 32 which receives signals at frequency $F_1$ and applies them to a diplexer 34, which separates frequencies $F_1$ and $F_2$ on the basis of frequency and applies received signals at frequency $F_1$ to a receiver 36. Receiver 36 downconverts the received signals and applies them over a conductor 37 to a processor illustrated as a block 40. Processor 40 processes the received data and commands from base station 10 (or from other mobile stations) and couples the data by way of an I/O port and a conductor 43 to a utilization apparatus (not illustrated), and also receives data from conductor 43 for transmission. Processor 40 processes data for transmission and applies it to a transmitter 38, which modulates the signal to a frequency $F_2$. The signal at frequency $F_2$ is coupled by diplexer 34 to antenna 32 for transmission. Processor 40 processes instructions from base station 10 for controlling the amplitude and possibly the phase of transmissions from transmitter 38, and also couples time-of-day information to transmitter 38 for control of its pseudorandom generator.

Masking station 50 includes an antenna 52 which receives signals at frequency $F_1$ from base station 10 and applies the received signals by way of a frequency diplexer 54 to a receiver 56. Receiver 56 at least downconverts the signals from base station 10 and applies the signals to a processor 60. Processor 60 processes the signals to form commands including time-of-day (TOD) signals and amplitude control signals, and controls the chip frequency and phase of a pseudorandom sequence which is applied to transmitter 58, and may also control the amplitude of the transmissions from transmitter 58 at frequency $F_2$.

Base station 10 and mobile station 30 ordinarily operate in a burst mode, transmitting only when information is available for transmission. Masking station 50 may transmit continuously. In general, the data transmitted by either master station 10 or mobile station 30 will be in the form of binary information phase-modulated onto a pseudorandom sequence. That is, the logic high and logic low conditions of the binary data are represented by inverted and noninverted conditions of the pseudorandom sequence over a predetermined number of chip intervals. As mentioned, the pseudorandom sequence may be used directly as a spreading code, additionally it may be used for frequency hop control. The signal transmitted by masking or decoy station 50 is modulated by an unmodulated pseudorandom sequence (i.e., one without periodic phase inversions due to data content). The masking station's pseudorandom sequence is known to at least the base station. Mobile station 30 and decoy station 50 transmit on the same frequency with the same type of modulation. The mobile and masking transmissions will be received together at master station 10. The chip rates and chip clock phases of the pseudorandom sequences of mobile station 30 and decoy station 50 are monitored at station 10, and instructions are transmitted at frequency $F_1$ from base station 10 and received by mobile station 30, decoy station 50, or both, for control of the chip rates to make the chip rates of the pseudorandom sequences equal. The frequency equality of chip rates, together with the equal transmitting frequencies, makes it impossible for an unauthorized signal interceptor to distinguish the signal of the mobile station from that of the decoy station. It should be noted, however, that since the path length from the mobile and masking stations to the unauthorized interceptor may not be equal, there may be a slight phase error between the chip clocks at the interceptor's site. In order to further increase the difficulty to the interceptor of distinguishing the signal of the mobile station from that of the masking station, the amplitude of the signal transmission from the mobile station is made as small as possible relative to the amplitude of the transmissions of the masking station, under control from the master station. Since the masking signals are much stronger than the desired data signals from the mobile station at all receivers, and the chip rates of the pseudorandom sequence are equal, it will be extremely difficult to extract the mobile station signal from the decoy signal. Since the pseudorandom sequence produced by the masking station is known to the base station 10, however, interference cancelling techniques can be used to make the data signal from the mobile station 30 readily available.

Since cancellation techniques make essentially clean mobile station signals available at base station 10, standard demodulation techniques using a regenerated mobile station pseudorandom signal (which is also known to the master station) are used to recover the data from the interference-cancelled mobile station signal.

Figure 2:
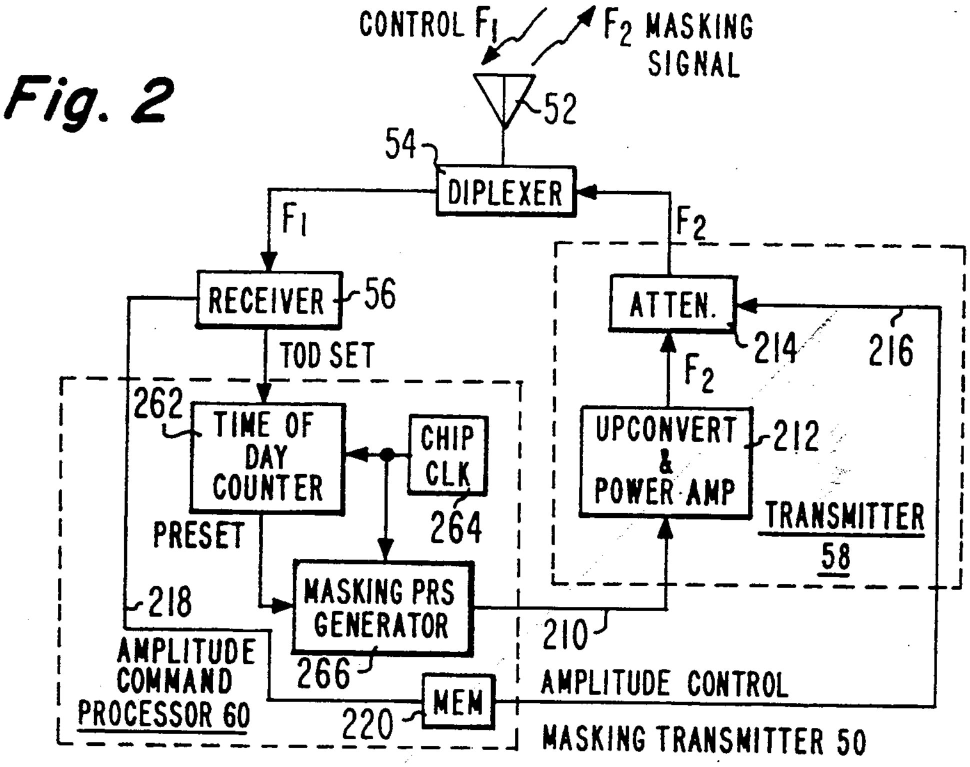
FIG. 2 is a simplified block diagram of the masking or decoy station of FIG. 1, which is typical of all the decoy stations of the system.

FIG. 2 is a block diagram of masking transmitter 50 of FIG. 1. In FIG. 2, those elements corresponding to elements of FIG. 1 are designated by the same reference numerals. In FIG. 2, processor 60 includes a time-of-day counter 262 which receives TOD set signals from master station 10 by way of receiver 56 for periodically being set thereby, and is clocked by clock signals from a chip clock generator 264. Chip clock signals are also applied from generator 264 to a masking PRS signal generator 266. As mentioned, PRS generator 266 generates a PRS signal which is known to master station 10. The masking PRS signal produced by masking generator 266 may be selected to be orthogonal to the pseudo-random signal produced by mobile station 30. The masking PRS signal produced by generator 266 is applied by a conductor 210 to an upconverter and power amplifier illustrated together as a block 212, which is part of transmitter 58. Upconverter and power amplifier 212 up converts the masking PRS signal to frequency $F_2$ and amplifies it to a selected power level. The signal from upconverter and power amplifier 212 is applied to a controllable attenuator 214 which controls the power level in accordance with amplitude control signals received over a conductor 216.

Amplitude control signals are periodically transmitted from master station 10 (FIG. 1) on frequency $F_1$, and are received by receiver 56 and applied over a conductor 218 to a memory 220. Memory 220 holds the amplitude command signals and applies them over conductor 216 to attenuator 214 for setting attenuator 214 to an amount of attenuation which causes the masking signal transmitted at frequency $F_2$ to have the desired amplitude.

Figure 3:
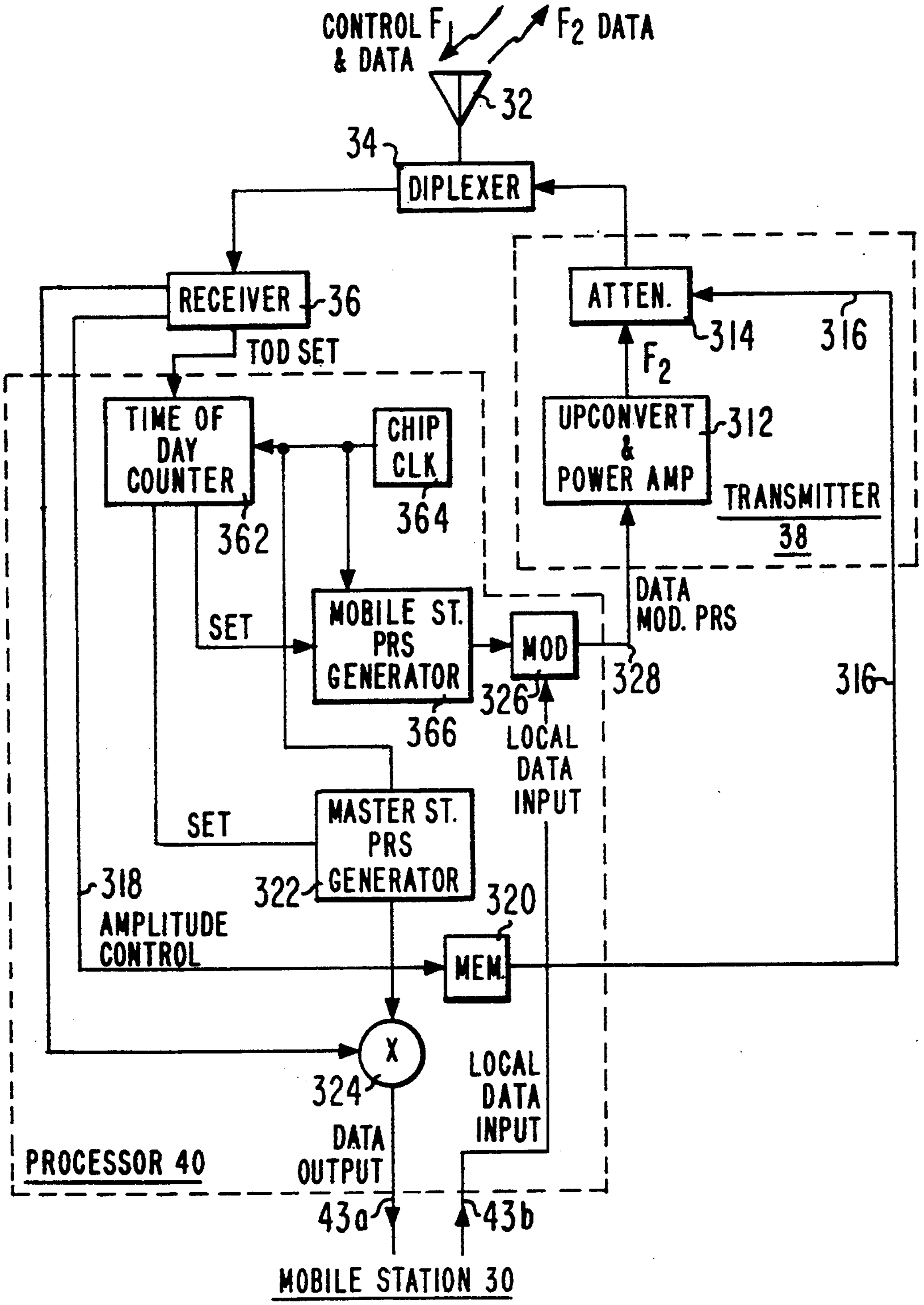
FIG. 3 is a simplified block diagram of the mobile station of FIG. 1, which is typical of all the mobile stations of the communication system.

FIG. 3 is a block diagram of mobile station 30 of FIG. 1. In FIG. 3, elements corresponding to those of FIG. 1 are designated with the same reference numeral. In FIG. 3, a time-of-day counter 362 is clocked by chip clock signals from a chip clock generator 364, and is set by TOD signals received by receiver 36 from master station 10. Time-of-day counter 362 initially sets a mobile station PRS generator (i.e., a PRS generator which generates a "mobile station" PRS signal) illustrated as a block 366, which is clocked by chip clock signals from generator 364. In one embodiment, data sent by the master station to the mobile station for use by an operator is additionally protected by a master station PRS generator. The master station PRS generator 322 (a generator producing a replica of the PRS signal used by master station 10 for encoding data) is clocked by chip clock generator 364 and controlled by TOD counter 362 to regenerate the master station PRS signal. The regenerated master PRS signal is applied to a multiplier 324. Multiplier 324 also receives demodulated signals from receiver 36 which are baseband representations of the signals received at frequency $F_1$ by antenna 32. The output of multiplier 324 on conductor **43*a* (part of I/O conductor 43) is data originally transmitted from master station 10 and intended for the operator of mobile station 30. Data generated locally by the user of mobile station 30 is applied over a conductor 43*b* (part of I/O conductor 43) to a modulator 326 for modulating mobile station PRS signal produced by generator 366. As known, modulator 326 may simply be a logic level inverter for phase inverting the mobile station PRS signal in response to the logic high and logic low levels of the local data. The modulated signal is applied from modulator 326 over a conductor 328 to an upconverter and power amplifier 212 of transmitter 38 which upconverts the modulated PRS signal to frequency $F_2$ and amplifies it to a high power level. The upconverted and amplified signal is applied to a controllable attenuator 314 which is controlled by an amplitude control signal applied over a conductor 316. The attenuated signal at frequency $F_2$ is applied to antenna 32 by way of diplexer 34. Receiver 36 receives from base station 10 amplitude control signals which are applied over conductor 318 to a memory 320, which stores the amplitude control information and applies it over conductor 316 to attenuator 314** to establish the desired transmitted power level.

In general, the relative amplitudes of the masking signal and the mobile station signals are controlled from master station 10 in such a fashion that the signal received by master station 10 from mobile station 30 is at a very low level compared with the signal received from masking station 50. If the signal received at master station 10 from mobile station 30 is too low, the bit error rate (BER, also known as burst error rate) may become large. The relative amplitudes of the masking signal and the mobile station signal are adjusted so that the mobile station signal can be received with the desired BER, yet be quite small compared with the masking signal. This adjustment makes unauthorized reception by an interceptor very difficult. It should be noted that the amplitude control may be performed at the masking station alone, at the mobile station alone, or at both.

At master station 10, (FIG. 1), antenna 12 receives signals at frequency $F_2$ from both mobile station 30 and masking station 50. Since both the mobile station signals and the masking signals are at frequency $F_2$, they form an ensemble of signals which cannot be separated on a frequency basis. Antenna 12 couples the received ensemble of signals through diplexer 14 to receiver 16.

Figure 4:
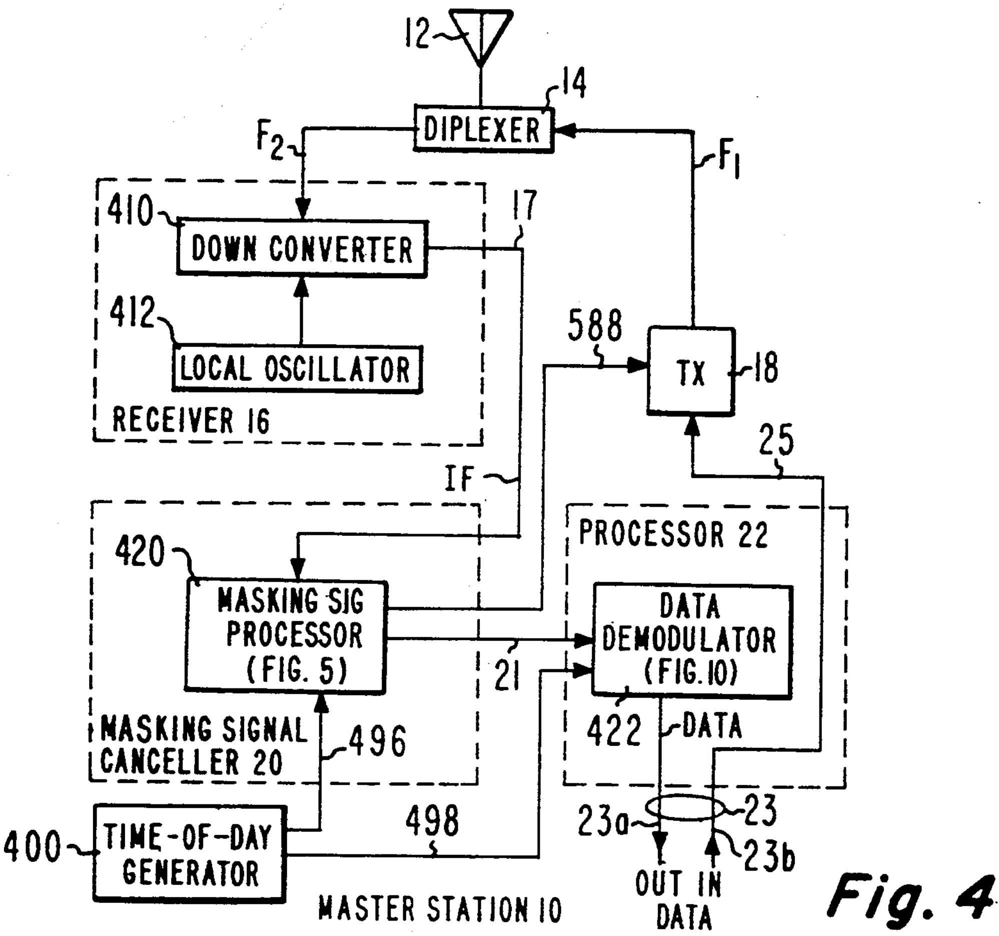
FIG. 4 is a simplified block diagram of the master station of FIG. 1 illustrating a masking signal processor and a data demodulator.

FIG. 4 is a block diagram of portions of master station 10 of FIG. 1 arranged for cancellation of the masking signal component of the received ensemble of received signals in order to produce clean mobile station signal, and thereby permit demodulation of the mobile station data. In FIG. 4, elements corresponding to those of FIG. 1 are designated by the same reference numeral. In FIG. 4, antenna 12 receives an ensemble of signals at frequency $F_2$, which are directed by diplexer 14 to a downconverter 410 (part of receiver 16) which also receives local oscillator signals from a local oscillator 412 for producing an ensemble intermediate frequency (IF) signal on a conductor 17 for application to masking signal canceller 20. As mentioned, the signals at frequency $F_2$ may be either direct sequence encoded signals which are downconverted to a band of IF frequencies, or they may be frequency hopped as well, whereupon local oscillator 412 produces frequency hopped local oscillator signals by well-known means. The masking signal and the received bursts of data which are masked thereby are processed by processor 420 which produces a continuous stream of unmasked IF signals on a conductor 21. The continuous stream of unmasked signals will include an occasional burst of data, and will just be noise during periods when bursts of data are not received. The unmasked signals are applied to a data demodulator 422, which is part of processor 22, for extraction of the data portion of the unmasked mobile station signal. The demodulated data originating from mobile station 30 (and from other similar mobile stations, if any) is made available to the operator of the master station at conductor **23*a*, which is part of conductor 23. A time-of-day generator 400 produces time-of-day signals which are applied to processor 420 and to processor 22 to aid in the signal processing. The time-of-day signals from generator 400 are also coupled to control means (not illustrated) for occasionally coupling time-of-day information to transmitter 18** for transmission to the mobile and masking stations.

Figure 5:
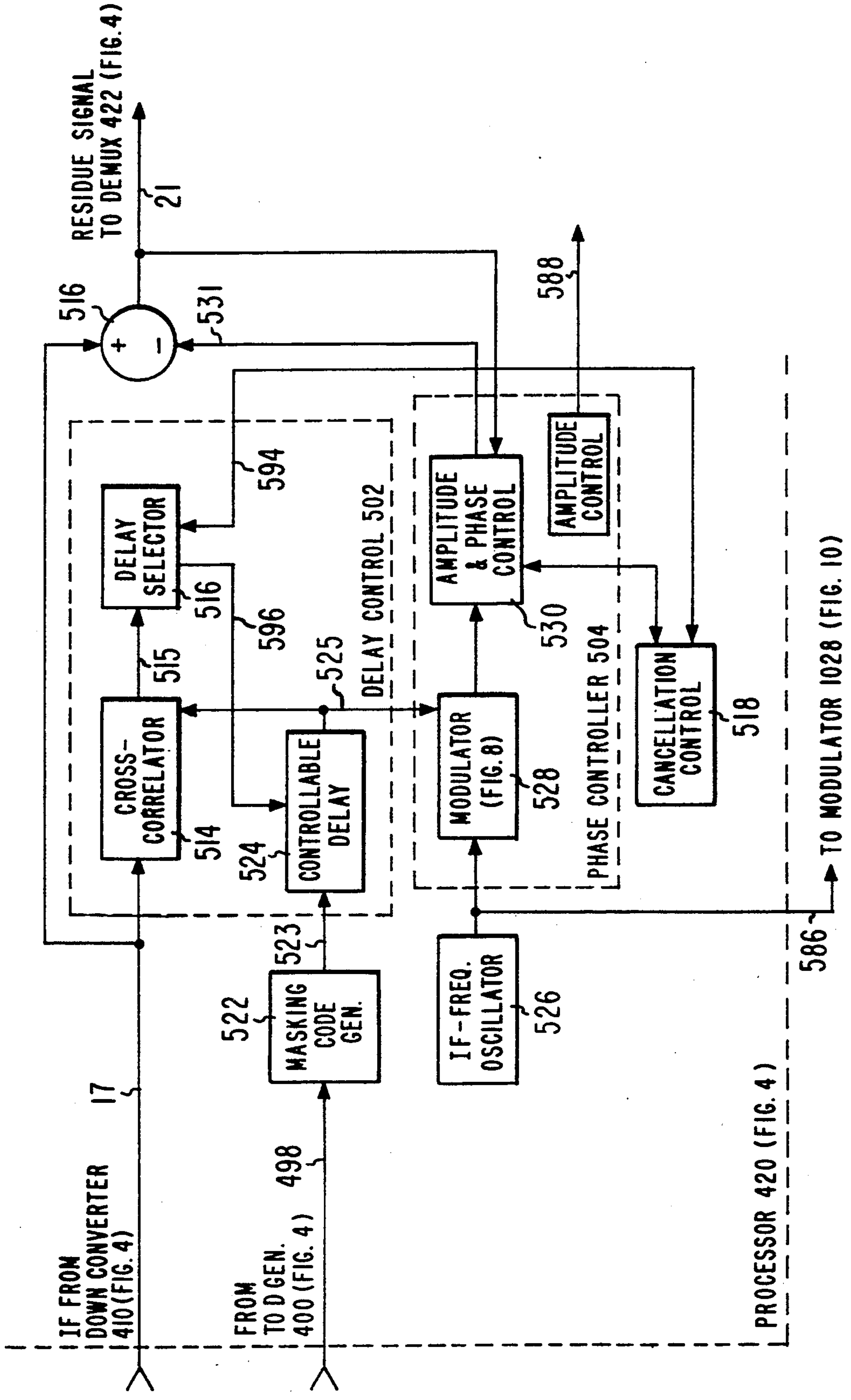
FIG. 5 is a simplified block diagram of the masking signal signal processor of FIG. 4, illustrating a delay control arrangement and a phase control arrangement.

FIG. 5 is a block diagram of processor 420 of FIG. 4. Elements of FIG. 5 corresponding to those of FIG. 4 are designated by the same reference numerals. Processor 420 receives over conductor 17 from downconverter 410 of FIG. 4 a stream of ensemble IF signals including the continuous masking signal and any mobile signal transmissions that may be concealed therein. There is no possibility of synchronizing a block of received information with a transmitted data burst from mobile station 30 (FIG. 1), because the mobile station signal concealed in the masking signal, and therefore cannot be synchronized with on an a priori basis. The IF-frequency ensemble signal is processed to generate a reproduction of the masking signal component thereof, and thereafter the ensemble signal as received is applied to the noninverting input terminal of a subtractor 516, and the reproduction of the masking component of the received signal is applied over a conductor 531 to the inverting input terminal of subtractor 516 to produce on conductor 21 a residue signal which is chiefly the mobile station signal, which is applied to data demodulator 422.

In the arrangement of FIG. 5, time-of-day signal is received over conductor 498 and is used to start a masking code generator 522 at the proper time-of-day in order to generate the known masking code. However, as a result of the fact that the TOD information was received at masking station 50 (FIG. 1) after transmission through a transmission path having a delay, and the masking signal transmitted from masking station 50 traversed the same signal path to be received at the master station, the TOD information received over conductor 498 will not correspond exactly with the effective time-of-day of the masking signal portion of the received ensemble signal (i.e. they will be relatively delayed). Therefore, the masking code generated by masking code generator 522 on conductor 523 must be delayed before it can be used to regenerate the masking signal corresponding to the received signal. This is accomplished by a delay controller 502 including a controllable delay element 524. Delay controller 502 performs repeated cross correlations of the selectively delayed locally generated masking code with the received ensemble signal in a cross correlator 514, and evaluates the results in a delay selector 516. Once delay controller 502 has established the correct delay, controllable delay 524 is set to the selected delay and a further iterative process is begun by a phase controller 504. Subsequently, the correct delay value may be maintained by periodically comparing the correlation value for taps adjacent to the selected tap and selecting the optimum tap. Phase controller 504 modulates a signal from an oscillator 526 in a modulator 528 to produce on a conductor 529 a signal at the same frequency (the IF frequency) as the ensemble signal, which is modulated by the same masking code, but in which the phase and amplitude of the IF component may not match that of the ensemble signal. An amplitude and phase control circuit 530 repeatedly adjusts the phase and amplitude of the modulated signal from modulator 528 and selects that one condition of amplitude and phase which results in the smallest residue signal on conductor 21. When the residue signal is smallest, the remaining signal is assumed to be noise or unmasked mobile station signal. Especially when the masking code and the pseudorandom code on which the mobile station data is modulated are selected to be orthogonal, the minor amount of remaining masking signal should not adversely affect the later demodulation of the mobile station component of the unmasked signal. It should be noted that an interceptor of the ensemble signal cannot perform the described process, because he does not know the masking code.

In operation, a cancellation controller 518 of processor 420 of FIG. 5 advises controller 502 to begin the delay selection process. As mentioned, this process involves repeated adjustment of controllable delay 524. The masking code is delayed by controllable delay 524 and applied to cross correlator 514 together with the ensemble signal. The cross correlation produces a signal on conductor 515 which depends upon how closely the delayed masking code on conductor 525 temporally matches the masking code component of the ensemble signal on conductor 17. This process is repeated until the optimum value of delay is selected, whereupon controllable delay 524 is set to the optimum value, cancellation control 518 is so advised, and the next step in the process of matching the masking component of the ensemble signal begins.

Figure 6:
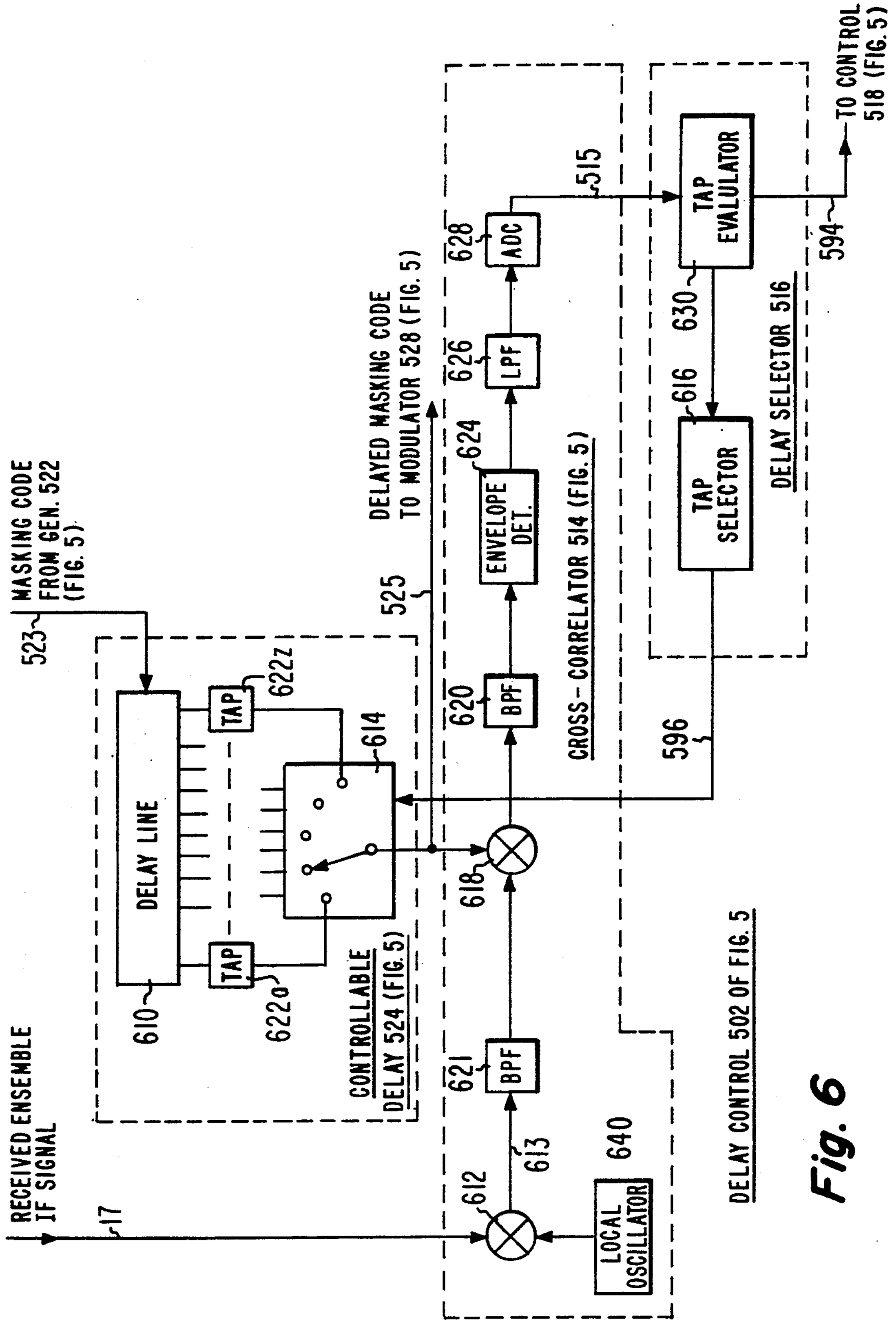
FIG. 6 is a simplified block diagram of the delay control arrangement of FIG. 5.

FIG. 6 is block diagram of delay control 502 of FIG. 5. In FIG. 6, elements corresponding to those of FIG. 5 are identified by the same reference numerals. In FIG. 6, the ensemble signal at IF frequency is applied over conductor 17 to a mixer 612 which is part of correlator 514. Concurrently, the masking code from generator 522 of FIG. 5 is generated and applied over conductor 523 to a delay line 610, which is part of controllable delay 524. Delay line 610 has a length equal to the maximum anticipated delay attributable to a two-way path between the master station and the masking station, plus processing delays. Delay line 610 has a plurality of taps, illustrated as *622a–622z*. Each tap is enabled in sequence by a single pole, multiple throw switch illustrated as a mechanical switch 614, under the control of a tap selector 616, which is part of delay selector 516. Tap selector 616 thus sequentially selects the position of switch 614, thereby enabling one tap from among the plurality of taps *622a–622z*. The received ensemble signal is applied to mixer 612, and a selectively delayed version of the masking code is applied from switch 614 to an input terminal of a mixer 618. The ensemble signal applied to mixer 612 is converted to a second IF frequency on a conductor 613 by means of a local oscillator signal from a local oscillator 640, and the second IF signal is applied by conductor 613 to a bandpass filter (BPF) 621. Bandpass filter 621 selects the appropriate mixing product, which is applied to an input terminal of mixer 618. Mixer 618 performs the cross correlation of the ensemble signal with the delayed replica of the masking code. The frequency produced at the output of mixer 618 is equal to the input frequency; the signal bandwidth depends on the degree of correlation of the signals applied to mixer 618. The output signal from mixer 618 is filtered by a bandpass filter 620, envelope detected by a detector 624, low pass filtered by a low pass filter (LPF) 626, and converted to a digital number by an analog-to-digital converted (ADC) 628 for application over conductor 515 to delay selector 516. The resulting signal on conductor 515 has an amplitude which is large when there is little difference in delay between the delayed replica of the masking code and the masking code component of the ensemble signal, and small otherwise.

Tap selector 616 of delay selector 516 steps through all taps 622a–622z sequentially. For each tap location, a correlation value is determined by correlator 514 and applied from ADC 628 to tap evaluator 630 of delay selector 516. The delay corresponding to the selection of the taps produces significant changes in the output from ADC 628, and the amplitudes of the various output signals produced during the recurrent operation are stored in tap evaluator 630. Evaluator 630 selects that tap exhibiting the highest correlation value (largest magnitude). The tap selections are passed on to cancellation control 518 of FIG. 5 by way of a conductor 594.

Figure 7:
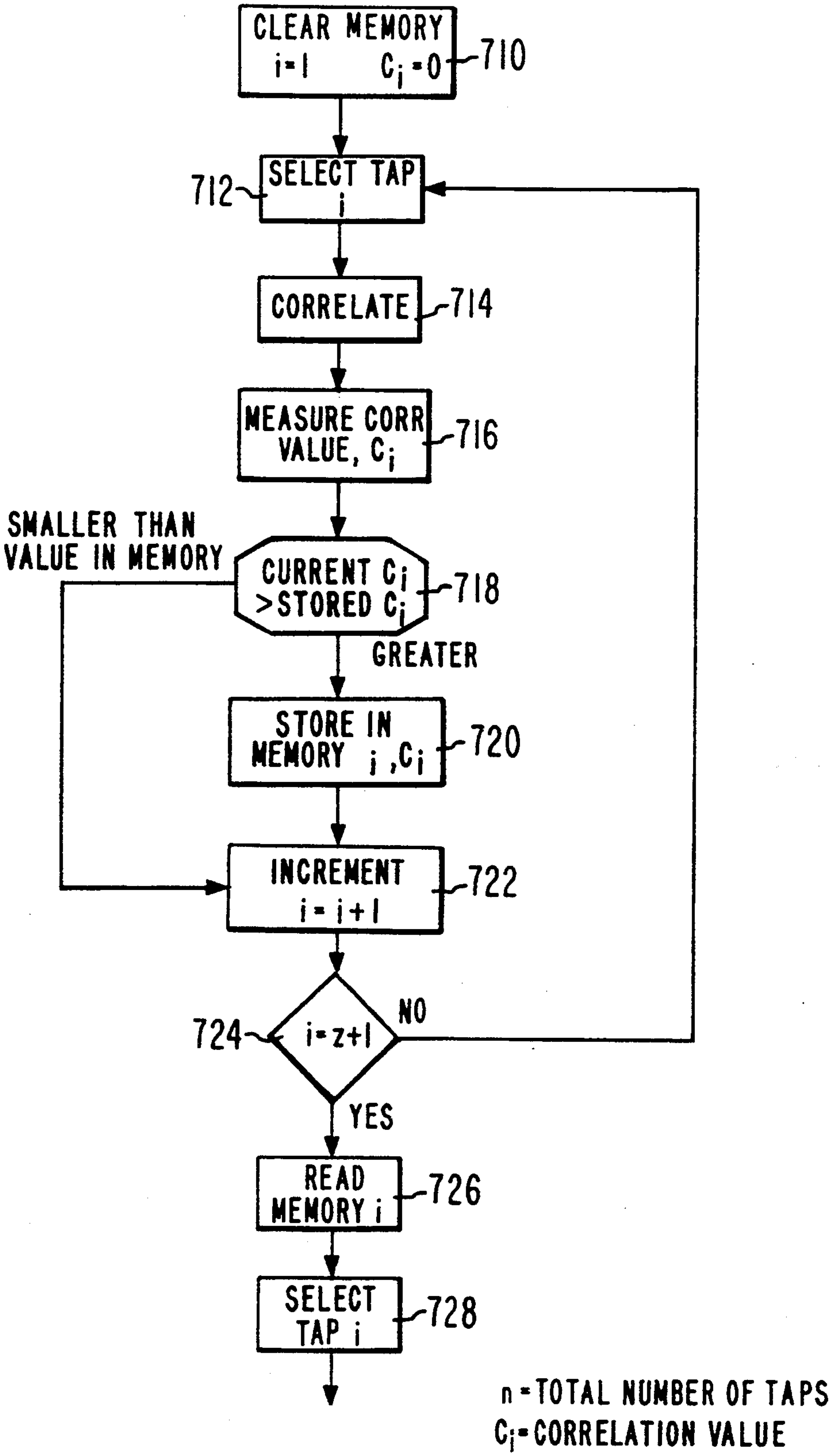
FIG. 7 is a flow chart illustrating the operation of the arrangement of FIG. 6.

FIG. 7 is a flow chart illustrating the operation of tap evaluator 630 in conjunction with tap selector 616 of FIG. 6. In FIG. 7, the processing begins at a block 710 representing the clearing of memory, and the setting of running variables $C_1$ to zero and i to one. The logic proceeds to a block 712 representing the selection of the $i^{th}$ tap (in this case the first tap) from among delay-line taps 622a–622z (FIG. 6), by appropriate setting of switch 614 (FIG. 6). The logic proceeds to block 714, which represents a short time delay to allow correlation to take place and for LPF 626 (FIG. 6) to achieve its final value. Block 716 represents the fetching of a digital number from ADC 628 (FIG. 6). This digital number is the correlation value $C_i$, representing the amount of correlation, or the temporal proximity of the masking signal component of the received ensemble signal with the delayed locally generated masking code. The logic then reaches a decision block 718, in which the current value of $C_i$ is compared with the value of $C_i$ previously stored in memory. (Since the memory was initially cleared, the value of $C_i$ stored in memory is zero on the initial iteration). If the comparison indicates that the new value of $C_i$ is greater than that stored in memory, the YES output of decision block 718 directs the logic to a block 720, which represents the substitution of the current value of $C_i$ for the previous value in the memory, whereupon the current value of $C_i$ becomes the stored value. The value of i corresponding to the new value of $C_i$ is also stored. The logic then flows from block 720 to a block 722, which represents incrementing of the value of i. If the current value of $C_i$ is less than the stored value, the logic is directed by the NO output of decision block 718 directly to block 722, thereby leaving the stored value of $C_i$ undisturbed. The logic flows from block 722 to a decision block 724, which compares the value of i with $z+1$ where z represents the last or $z^{th}$ tap. If the $z^{th}$ tap has not been reached, the logic is directed by the NO output of decision block 724 back to block 712, and a further test of the correlation is performed for the value of delay represented by the next tap. This procedure is followed until all taps have been evaluated, and the maximum value of correlation $C_i$ is stored in memory together with the identity i of the tap which gave the maximum value of correlation. When the $z^{th}$ tap has been tested, the value of i is incremented to a value of $z+1$ in block 722, whereupon the YES output of decision block 724 directs the logic to a block 726, which represents the reading of i from memory. Block 728 represents the setting of switch 614 (FIG. 6) to that switch position which selects the $i^{th}$ tap from among taps 622a–622z. Block 728 also represents sending a signal to cancellation control 518 (FIG. 5) indicating that the correct value of delay has been achieved.

Once the appropriate delay to be applied to the reproduced masking code generated by masking code generator 522 has been determined, the masking code, appropriately delayed by controllable delay 524 (FIG. 5) can be used to generate a reproduction of the masking signal component of the ensemble signal. As mentioned, this is accomplished by applying the appropriately delayed masking code to modulator 528 of FIG. 5 together with a signal from an oscillator 526 which is at the intermediate frequency. Thus, under ideal conditions, if oscillator 526 happened to have the right amplitude and happened to be in-phase with the masking component of the ensemble signal, the modulated signal appearing on conductor 529 could be applied directly to the inverting input terminal of subtractor 516 to reduce the magnitude of or eliminate the masking signal. However, the phase and amplitude of the modulated signal on conductor 529 cannot in general be expected to have the correct values. The correct amplitude and phase are selected in an iterative procedure.

Figure 8:
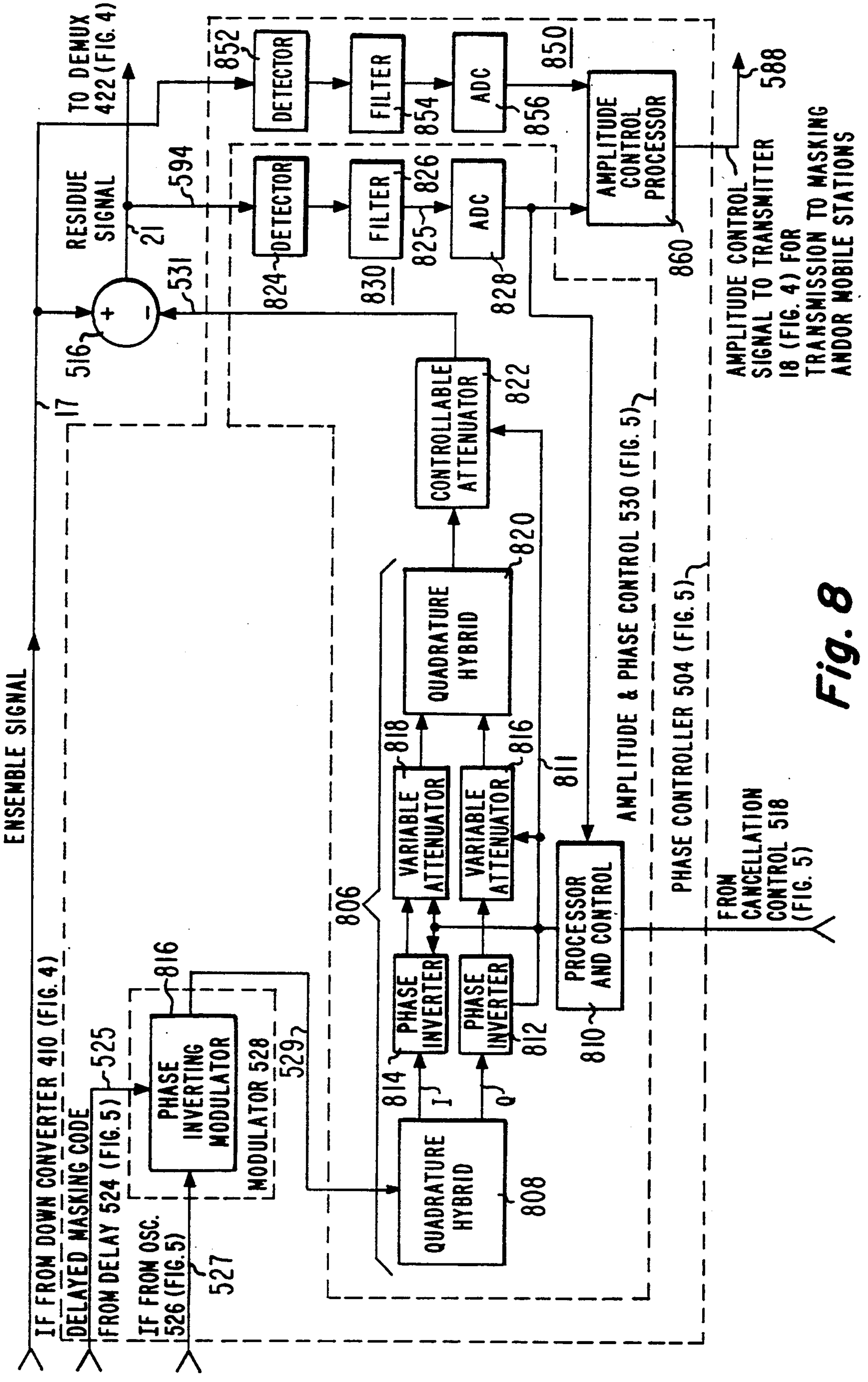
FIG. 8 is a simplified block diagram of the phase control arrangement of FIG. 5.

FIG. 8 is a block diagram showing details of phase controller 504 and its interaction with subtractor 516 of FIG. 5. Elements of FIG. 8 corresponding to those of FIG. 5 are designated by the same reference numerals. The ensemble signal is applied to the noninverting input terminal of subtractor 516, and simultaneously therewith the masking code is read and delayed, and applied over conductor 525 to a phase inverting modulator 816 which receives IF frequency oscillations over conductor 527. The delayed masking code modulates the oscillations to produce a signal similar to the masking code modulated portion of the received IF frequency ensemble signal, but in an arbitrary amplitude and phase. In FIG. 8, the pseudorandom masking code modulated IF signal is phase controlled by the combination of a quadrature hybrid (also known as a 3 dB or 90° hybrid) 808, which produces two relatively phase-shifted, equal-amplitude signals. Its output signals (designated I and Q) are applied to a pair of controllable phase inverters 812, 814, which allow the range of phase control to be extended from 90° to 360°. The selectively phase inverted I and Q signals are applied to a pair of variable attenuators 816, 818 which independently control the relative amplitudes of the I and Q components, which are then recombined in a vectorial manner in a second quadrature hybrid 820, thereby producing the pseudorandom masking code modulated IF signal with an IF phase selectively controllable over a 360° range, but with an amplitude which varies in dependence upon the phase control. A controllable attenuator 822 normalizes and adjusts the amplitude of the phase-controlled signal, whereupon it is ready for application over conductor 531 to the inverting input terminal of subtractor 516 for cancellation of the IF-frequency masking component of the residue signal on conductor 17. Depending upon the relative phase of the signals applied to the noninverting and inverting input terminals of subtractor 516, the masking signal component of the residue signal may be increased or decreased. A processor and control circuit 810 receives a start instruction over conductor 590 from cancellation control circuit 518 of FIG. 5 at the time that delay control circuit 502 of FIG. 5 has completed evaluation of the proper delay which must be imposed upon the masking code from masking code delay generator 522 of FIG. 5, and has set controllable delay 524 (FIG. 5) to the proper delay. Processor and control circuit 810 responds to the start instruction by producing initial phase control signals on a conductor 811 for individual control of phase inverters 812, 814, variable attenuators 816, 818 and produces an initial amplitude control signal for application to variable attenuator 822. Processor and control circuit 810 then begins a first iteration for evaluation of the proper IF phase for the reproduction of the masking signal component of the ensemble signal. The residue signal is applied over a conductor 594 to a detector 824 to produce a detected signal which is applied to a low pass filter 826 which filters the IF from detected signal to produce on conductor 825 a signal representative of the amplitude of the residue signal, which is converted to a digital signal by an analog-to-digital converter (ADC) 828 and applied to processor and control circuit 810. Detector 824, filter 826 and ADC 828 together constitute an amplitude measurement system 830. Processor and control circuit 810 temporarily stores the information relative to the amplitude of the residue signal and adjusts the phase and amplitude control signals on conductor 811. In this fashion, processor and control circuit 810 iteratively adjusts the phase and amplitude control signals on conductor 811 to produce a combination of phase and amplitude control of the IF component of the modulated signal output of modulator 816 which minimizes the residue signal on conductor 21. The IF frequencies are low to allow digital signal storage; oscillator drift during the adjustments is therefore not a problem.

Also illustrated in FIG. 8 is a further amplitude measurement system 850 including a detector 852 coupled to conductor 21 for receiving ensemble signal for producing rectified ensemble signal, a filter 854 which filter the IF component from the rectified ensemble signal to produce a baseband signal the amplitude of which is related to the peak ensemble signal amplitude, and an ADC 856 which produces a digital signal representing the filtered value. Since the mobile station portion of the ensemble signal is small, the peak amplitude of the ensemble signal is a good approximation to the amplitude of the masking signal. The residue signal at the output of ADC 828 is a good approximation of the magnitude of the mobile station signal. A control processor 860 is coupled to ADC 828 and 856 to compare the relative amplitudes and to periodically generate a control signal on conductor 588 for transmission, for allowing the mobile station, the masking station, or both, to adjust their amplitudes to maintain the received mobile station signal (as represented by the residue signal) at a predetermined level (for example 30 dB) below the received masking station signal (as represented by the ensemble signal).

Figure 9:
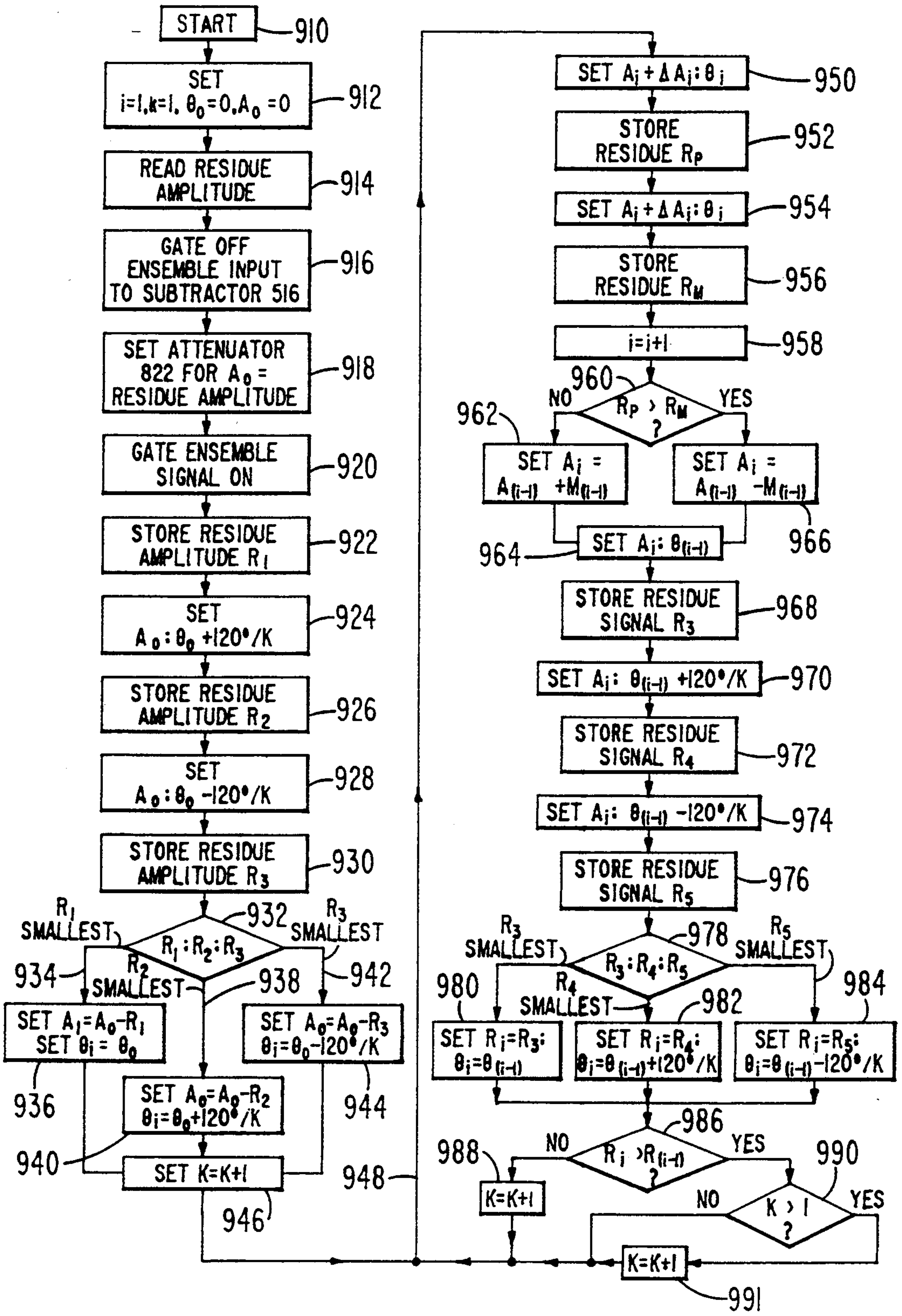
FIG. 9 is a flow chart illustrating the operation of the arrangement of FIG. 8.

FIG. 9 is a simplified flow chart illustrating the logic operations of processor and control circuit 810 (FIG. 8) of amplitude and phase control 530 as it initially finds the proper amplitude and phase required for the reproduced IF-frequency masking signal component so that when subtracted from the IF-frequency ensemble signal, the residue signal will be substantially clean unmasked mobile station signal. The portion of FIG. 9 extending from block 910 to block 946 represents an initializing portion, during which the reproduced IF-frequency masking signal is initially set equal in amplitude to the ensemble signal, the proper phase is determined to within 120°, and the amplitude of the reproduced IF-frequency masking signal is reduced by the magnitude of the residue signal in order to better approximate the correct magnitude of the masking signal component of the ensemble signal. That portion of the flow chart of FIG. 9 after block 946 is a closed logical loop which continually seeks the exact amplitude and phase which gives the smallest residue signal, thereby compensating for ongoing changes.

In FIG. 9, the initialization procedure begins at a block 910, and the logic proceeds to a block 912 representing the setting of running variables i and k to units, the setting of phase shift through phase shifter 806 (FIG. 8) to 0°, and the setting of attenuator 822 to maximum attenuation (initial output amplitude $A_o=0$). The residue amplitude is then read from ADC 828 (FIG. 8), as represented by block 914. With the reproduced masking signal amplitude equal to zero, the output amplitude of subtractor 516 (FIG. 8) equals the amplitude of the ensemble signal. Thus, the reading of ADC 828 in block 914 provides information relating to the amplitude of the ensemble signal. Since the mobile signal component of the ensemble signal is small, the ensemble signal amplitude is nearly all masking signal component. An initial approximation for the masking signal amplitude therefore, is obtained by setting it equal to the ensemble signal amplitude. The initial amplitude of the reproduced masking signal is set by the process beginning with block 916, in which the ensemble signal input to subtractor 516 (FIG. 8) is gated off (by means which are not illustrated). With the ensemble input to subtractor 516 removed, the amplitude of the reproduced masking signal component is gradually increased by reducing the attenuation of attenuator 822 (FIG. 8), as represented by block 918 of FIG. 9, until the masking signal component equals the magnitude of the residue signal previously read in block 914. With the amplitudes now initially set, the ensemble signal is gated ON in block 920. The logic flows to block 922, in which the amplitude of the residue $R_1$ resulting from subtraction of 0°, equal-amplitude reproduced masking signal from the ensemble signal is stored in memory. In block 924, the phase of the reproduced masking signal component is changed by phase shifter 806 to a new value of $\theta_o+120°/k$, which for $k=1$, $\theta_o=0°$, represents a phase angle of 120°. Block 926 represents the reading and storing of the magnitude $R_2$ of the residue signal. Block 928 represents setting of the phase shifter to $\theta_o-120°/k$, which for $\theta_o=0°$, $k=1$ represents a reproduced masking signal phase of $-120°$. Block 930 represents the reading and storing of the residue signal $R_3$ corresponding to $-120°$. A decision block 932 is then reached, in which the relative magnitudes of $R_1$, $R_2$ and $R_3$ are compared. If $R_1$ is smallest, this means that a 0° IF phase shift of the reproduced masking signal component, when subtracted from the ensemble signal applied to subtractor 516, is the closest of the three phases tested, and the logic flows to a block 936, which represents the setting of the phase angle $\theta_i$ to 0°. The magnitude of the residue is assumed to be mobile station signal, so the amplitude $A_i$ of the reproduced masking signal component is reduced by $R_1$. Similarly, if $R_2$ is smallest among $R_1$, $R_2$ and $R_3$, the logic flows to block 940, in which $\theta_i$ is set to $\theta_o+120°/k$ and $A_i$ is set to $A_o-R_2$; if $R_3$ is smallest block 944 is reached, in which $\theta_i$ is set equal to $\theta_o-120°/k$ and $A_i$ is set equal to $A_o-R_3$. From any of blocks 936, 940 or 944 the logic flows to a block 946, in which running variable k is incremented to k+1. This completes initial setting of the phase of the reproduced masking signal component to one of three phase signals 0°, +120° or −120°, and the setting of the amplitude to equal the difference between the ensemble signal amplitude and the initial residue signal amplitude.

The logic flows from block 946 by path 948 to a block 950, in which fine amplitude control begins by setting of the amplitude of the reproduced masking signal component to $A_i+M_i$, where $M_i$ is a small value, and the phase to $\theta_i$. The residue signal $R_p$ is read and stored in block 952. The amplitude and phase are set to $A_i-M_i$, $\theta_i$ in block 954, and the resulting residue signal $R_M$ is read and stored in block 956. The running variable i is incremented to i+1 in block 958, and the relative amplitudes of $R_p$ and $R_M$ are evaluated in a decision block 960. If $R_p$ is greater than $R_M$, then the reproduced masking signal component is too large, since incrementing its magnitude by $M_i$ resulted in a larger residue signal, and the logic flows by the YES output of decision block 960 to a block 966, which represents the setting of $A_i$ to $A_{(i-1)}-M_{(i-1)}$. On the other hand, if $R_p$ is smaller than $R_M$, the reproduced masking signal component is too small, since incrementing its value made the residue signal smaller, in which case the logic flows by the NO output of decision block 960 to a block 962, in which $A_i$ is set equal to $A_{(i-1)}+M_{(i-1)}$. From either of blocks 962 or 966, the logic flows to a block 964, in which the amplitude of the reproduced masking signal component is set to $A_i$, and the phase is set to $\theta_{(i-1)}$, which are the best currently known values.

With the amplitude set as described in conjunction with blocks 950 to 966, a fine control of phase is performed in blocks 968-986. The fine control of phase begins (block 968) by the storing of residue signal $R_3$, resulting from phase $\theta_{(i-1)}$ and amplitude $A_i$ as set by block 964. The phase is changed to $\theta_{(i-1)}+120°/k$ in block 970 with the same amplitude setting $A_i$. Since k equals two at this point in the logic, $\theta_{(i-1)}$ is incremented by 120°/k or 60°. The resulting residue signal $R_4$ is read and stored in block 972. The phase is changed to $\theta_{(i-1)}-120°/k$ or decremented by 60° in block 974, and the corresponding residue signal R5 is read and stored in block 976. Decision block 978 compares $R_3$, $R_4$ and $R_5$ to determine which is smallest. If $R_3$ is smallest, the logic flows to block 980 in which a variable $R_1$ is set equal to $R_3$, and variable $\theta_i$ is set equal to $\theta_{(i-1)}$. Similarly, logic block 982 sets $R_i$ equal to $R_4$ and $\theta_i$ equal to $\theta_{(i-1)}+120°/k$ if $R_4$ was smallest among $R_3$, $R_4$ and $R_5$, and logic block 984 sets $R_i$ equal to $R_5$ and $\theta_i$ equal to $\theta_{(i-1)}-120°/k$ if $R_5$ was smallest. Thus, the phase of the masking signal component, initially correct within 120°, is now correct within 60°. The logic flows from any of blocks 980, 982 or 984 to a decision block 986 in which the currently least residue signal $R_i$ is compared in amplitude with the previous value. If the current value is smaller than the previous value, the logic flows by the NO output of decision block 986 to a block 988, in which the value of running variable k is incremented, and the logic flows by path 948 back to block 950 to begin another iteration of amplitude control, followed by another iteration of phase control, during which the phase will be corrected to within 120°/3 or 40°.

This procedure will continue, with the phase being refined to within 120/k of the correct value, and the amplitude continually approaching the correct amplitude to within incremental value $M_i$. Eventually a condition will be reached in which the correction will overshoot, or the phase will drift, so that $R_i$ will exceed $R_{(i-1)}$, and the logic will leave decision block 986 by the YES output, and reach a further decision block 990, which determines whether or not k is greater than unity. If k is greater than 1, the logic leaves decision block 990 by the YES output and reaches a block 991, in which the value of k is decremented, thereby making the correction more coarse on the next iteration. The NO output of decision block means that the value of k is too small to decrement. In any case, both outputs of decision block 990 return the logic by path 948 to block 950 to begin another iteration. Since the amplitude is initially set very close to the masking signal level amplitude, very small increments or decrements are adequate for closing the amplitude control loop.

Referring now once again to FIG. 4, processor 420 produces on conductor 21 a stream of residue signals which includes unmasked burst signals originating from mobile stations, which signals are applied over conductor 21 to data demodulator 422 of processor 22.

Figure 10:
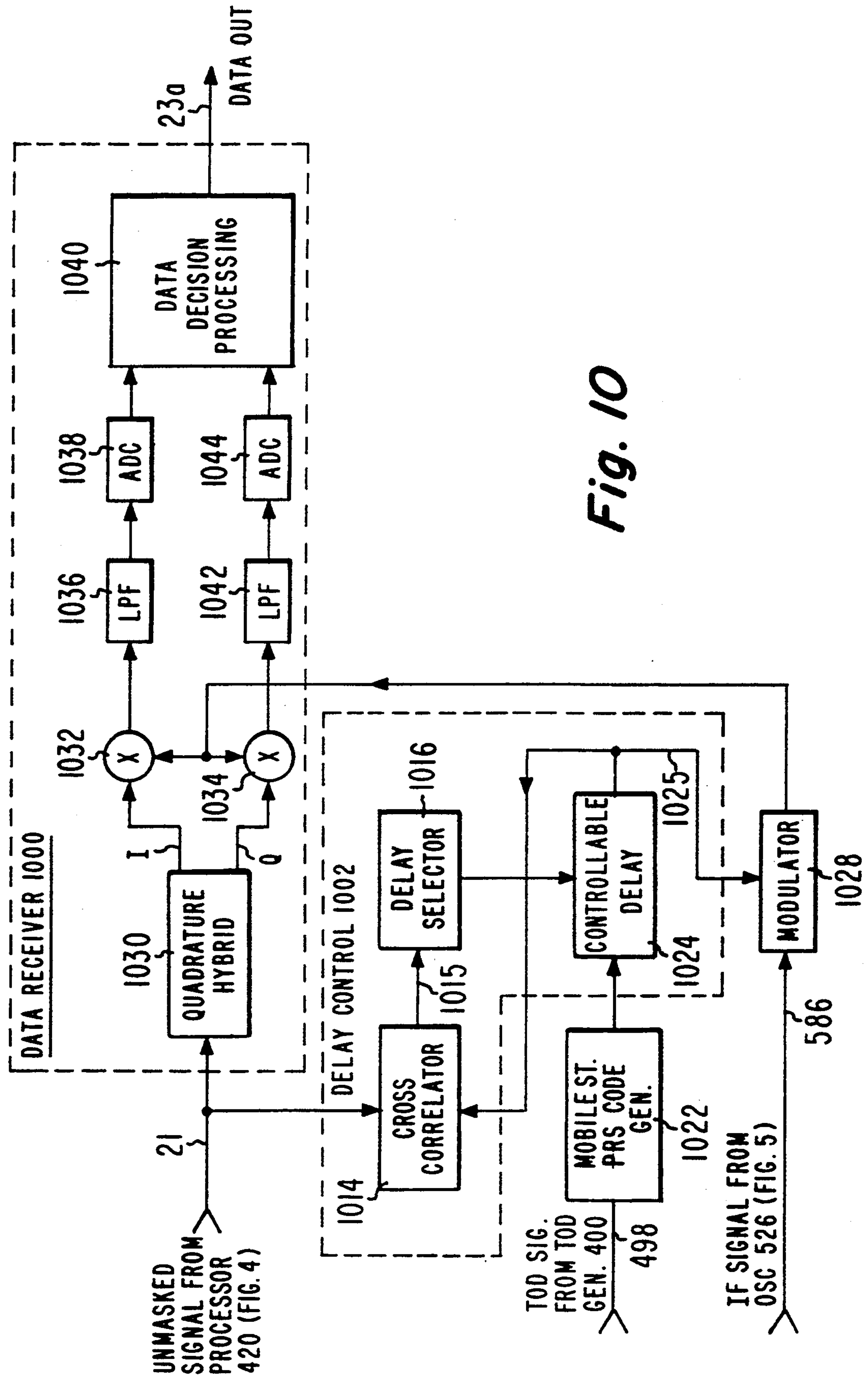
FIG. 10 is a simplified block diagram of the data demodulator of FIG. 4.

FIG. 10 is a block diagram of data demodulator 422 of FIG. 4. In FIG. 10, the unmasked IF-frequency signal is continuously applied over conductor 21 to a data receiver 1000 which includes a quadrature hybrid 1030, which divides the signal into equal-amplitude I and Q components, which are applied to synchronous mixers or demodulators 1032 and 1034, respectively, to produce baseband signals. The recovered baseband signals from mixer 1032 are applied to a low pass filter (LPF) 1036 for filtering, and an ADC 1038 produces a digital I signal for application to a conventional data decision processor 1040. Similarly, the baseband Q signal from mixer 1034 is applied by way of a filter 1042 and an ADC 1044 to data decision processor 1040. Decision processor 1040 calculates the phase angle from the I and Q components and detects phase reversals indicative of transmitted data bits. Decision processor 1040 produces, on conductor 23*a*, decided data which originated from mobile station 30 (FIG. 1) or from other equivalent stations.

The reference signal for mixers 1032 and 1034 of FIG. 10 is an IF-frequency signal modulated by an appropriately delayed replica of the mobile station PRS signal. Since the mobile and masking station signals as received at master station antenna 12 were at the same frequency (to prevent their separation on a frequency basis), and they were downconverted by the same process, the masking signal IF frequency equals the IF frequency of the unmasked mobile station signal. Consequently, the IF signal for application to mixers 1032 and 1034 can be the IF signal from oscillator 526 of FIG. 5, appropriately modulated with a delayed version of the mobile station PRS code. A modulator 1028 is coupled by conductor 586 to receive IF-frequency signal from oscillator 526 (FIG. 5). Modulator 1028 phase-modulates the IF-frequency signal by a delayed replica of the mobile station code received over a conductor 1025, and applies the modulated IF-frequency signal to mixers 1032 and 1034.

The mobile station PRS signal by which modulator 1028 is modulated originates from a mobile station PRS code generator 1022, which receives TOD signals from TOD generator 400 over a conductor 498. As with the masking station PRS signal, the mobile station PRS code produced by generator 1022 is not in-phase with the mobile station PRS code on conductor 21, because the TOD of the signal received at the mobile station from the master station passed through a path-length delay, and the signal received at the master station from the mobile station also passed through a path-length delay. The delay of the mobile station signal is in general not the same as the delay of the masking station PRS code, and must therefore be determined independently. The determination and control of the appropriate delay is performed by a delay control unit 1002 including a cross correlator 1014, delay selector 1016, and controllable delay 1024, corresponding exactly to delay control unit 502, cross correlator 514, delay selector 516, and controllable delay 524 of FIG. 5. Since the operation of the delay control is described in detail in conjunction with FIGS. 5 and 6, the details are not repeated.

If the mobile station signal is in the form of bursts, rather than a continuous signal, the arrangement of FIG. 10 may require too much acquisition time, resulting in the loss of some of the transmitted data. If bursts of data are to be demodulated, an arrangement such as that of FIG. 11 may be used. Generally speaking, the arrangement of FIG. 11 stores the unmasked burst signal in memory, and performs a repeated search for the correct phase of the mobile station PRS signal which will correctly demodulate the signal.

Figure 11:
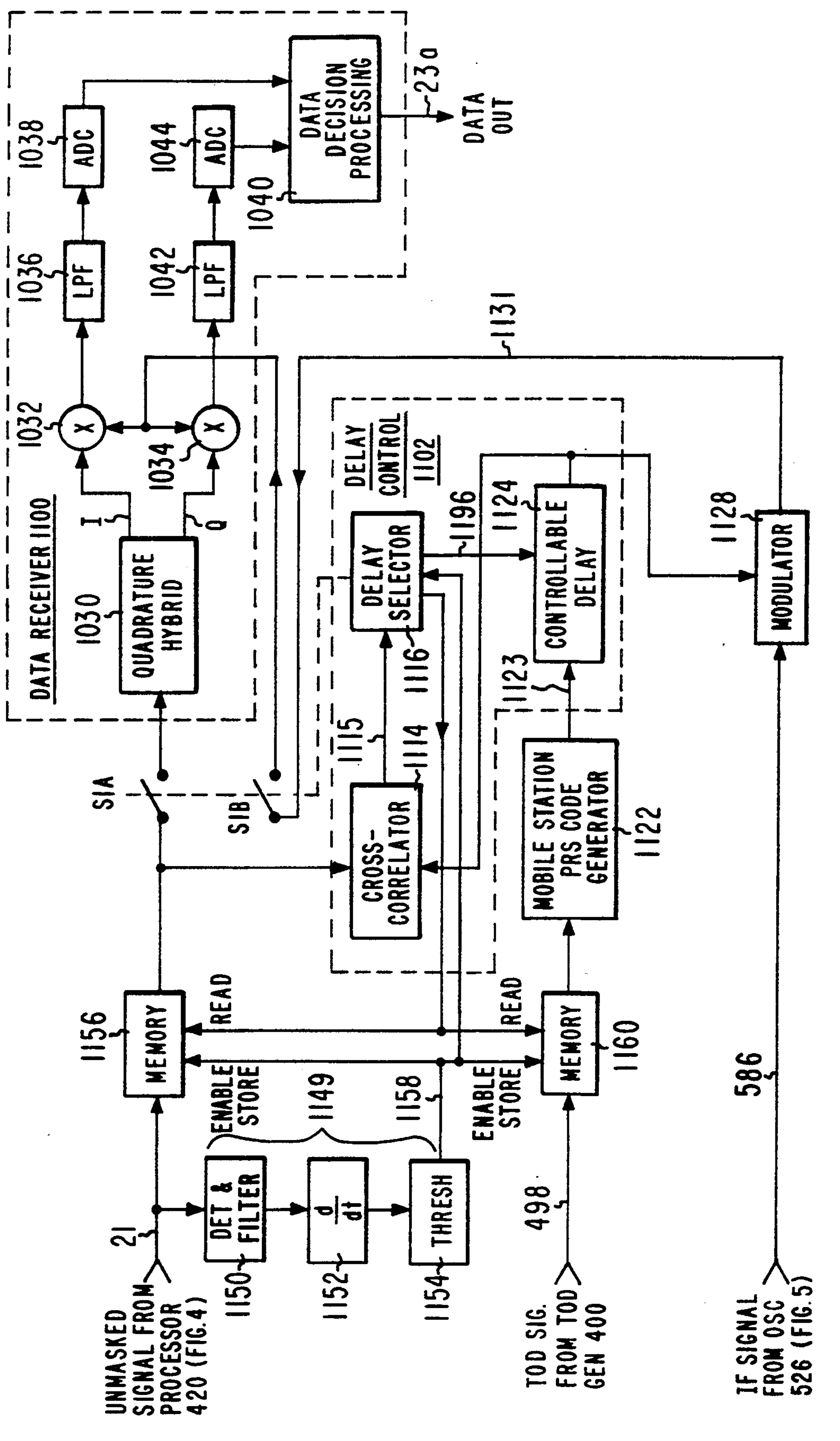
FIG. 11 is a simplified block diagram of a master station arrangement arranged for reducing the effect of multipath distortion.

In FIG. 11, unmasked IF frequency residue signal arrives over conductor 21 and is applied to a memory 1156 and to a transition detector 1149 including a detector and filter 1159, a differentiator (d/dt) 1152, and a threshold comparator 1154. When the unmasked signal contains no burst communication from the mobile station, the residue signal on conductor 21 is at a relatively low level representing system noise level. When the mobile station burst arrives, the magnitude of the residue signal rises sharply. Transition detector 1149 detects the increase in level, and produces a signal on a conductor 1158 which enables memory 1156 to cause storage of the burst signal either for a fixed frame interval or until the burst terminates. A further memory 1160 is also enabled by the signal on conductor 1158 for one clock cycle, in order to store the current time of day signal received over conductor 498.

As mentioned, a replica of the mobile station PRS signal which is set by the master station time of day (TOD) signal may not be in-phase with the mobile station PRS signal component of the burst currently being received, because of path delays. As in the case of the arrangement of FIGS. 5 and 6, iterative procedures are used to determine the proper delay. However, when the burst is short in duration, the iterative procedure is made possible by repeated readings of the received burst from memory 1156, concurrent with reading of memory 1160 to establish the time of day at the moment at which reception of the burst begins, and initialization of a mobile station PRS generator 1122 with the TOD read from memory 1160. A delay control arrangement 1102 including a cross-correlator 1114, delay selector 1116, and controllable delay 1124 repeatedly tries different delays of the reproduced mobile station PRS signal, and selects that delay giving the greatest cross-correlation. Once the proper delay is established, a switch S1A is closed to connect the output of memory 1156 to a data receiver 1100 identical to data receiver 1000 of FIG. 10, and the mobile station PRS generator is initialized to begin generation of mobile station PRS signal, which is delayed by the correct delay and which modulates IF signal from IF oscillator 526 (FIG. 5) in a modulator 1128. The resulting IF signal phase-modulated by a mobile station PRS signal of the correct delay is applied to data receiver 1100 for demodulation and data decision through a second switch S1B ganged with switch S1A.

Elements of data receiver 1100 are identical to those of data receiver 1000 of FIG. 10 and are designated by the same reference numbers. Similarly, cross-correlator 1114 and controllable delay 1124 of delay control 1102 are identical to cross-correlator 514 and controllable delay 524 of delay control 502 (FIGS. 5 and 6), and are not described further.

Delay selector 1116 of delay control 1102 is connected to conductor 1158 and is initialized by the signal from threshold circuit 1154 at the moment that the storage of residue signal in memory 1156 ends.

Figure 12:
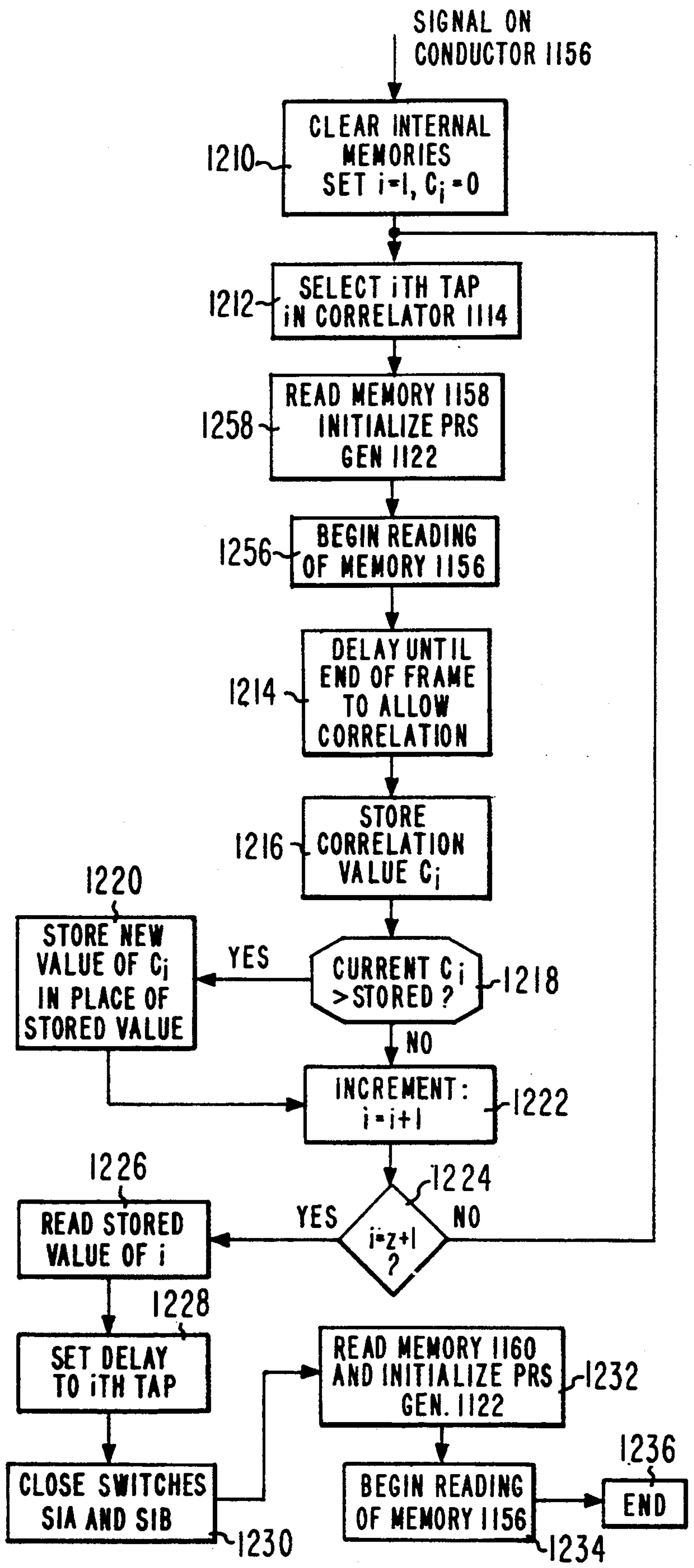
FIG. 12 is a simplified flow chart illustrating the operation of the arrangement of FIG. 11.

FIG. 12 is a flow chart illustrating the logic flow associated with delay selector 1116 during operation. In FIG. 12, a block 1210 is reached as a result of a signal on conductor 1158 (FIG. 11) representing the completion of storage of a burst signal in memory 1156. In block 1210, memories internal to delay selector 1116 are set to zero, running variable i is set to 1, and correlation value $C_i$ is set to zero. The logic flows to a block 1212, which represents selection of the $i^{th}$ delay tap in correlator 1114. The next logic block, 1258, represents the control of memory 1158 (FIG. 11) to read the TOD which existed at the moment the burst began to be received, and initialization of mobile station PRS generator 1122 (FIG. 11) to produce a PRS signal with nominal zero delay. The logic immediately flows to block 1256, which represents the beginning of reading of stored burst signal from memory 1156 (FIG. 11). Block 1214 is reached, which represents a delay of the logic for a period of time sufficient to perform correlation, which will generally be a delay until the end of a frame of burst signal. After the delay, the logic flows to a block 1216, which represents the reading of the correlation value $C_i$. The logic then arrives at a decision block 1218, which represents a comparison of the last stored value of $C_i$ with the current value read in block 1216. If the current value of $C_i$ is greater than the stored value, the logic flows by the YES output of decision block 1218 to a block 1220, in which the current value of $C_i$ is substituted in memory for the previously stored value. The logic flows from block 1220 to a block 1222, and also flows directly from the NO output of decision block 1218 to block 1222. In block 1222, running variable i is incremented to $i+1$. A decision block 1224 compares the current value of i with $z+1$, which is one more than the total number of taps in controllable delay 1124 (FIG. 11). If i is less than $z+1$, all the taps have not been evaluated, and therefore all possible values of delay have not been tested, so the NO output of decision block 1224 directs the logic back to block 1212, to begin another test. If all the delays have been tested, the YES output of decision block 1224 directs the logic to a block 1226, representing the reading of the i corresponding to the stored value of $C_i$. Block 1228 represents the setting of controllable delay 1124 to the delay corresponding to the $i^{th}$ tap. Block 1230 represents the closing of switches S1A and S1B (FIG. 11) so as to allow the burst signal and reproduced, properly delayed mobile station PRS signal to be applied to data receiver 1100 (FIG. 11). Blocks 1232 and 1234 represent a final reading of memory 1160 (FIG. 11) to initialize mobile station PRS generator 1122 (FIG. 11), and a final reading of stored burst signal from memory 1156, after which the logic ends at a block 1236. The stored burst signal from memory 1156 (FIG. 11) during the final reading is applied through switch S1A to data receiver 1100. The mobile station PRS signal during the final reading is delayed by controllable delay 1124 (now set to the correct delay by selection of the correct tap), and the delayed PRS signal modulates the IF signal in modulator 1128 (FIG. 11) to produce the reference signal which is applied through switch S1B to receiver 1100 as a reference signal to permit demodulation of the stored mobile station burst signal.

If it is desired to demodulate burst signals concurrently received from a plurality of mobile stations, this may be accomplished by selecting the PRS codes of the various different mobile stations to be orthogonal or approximately orthogonal, and by providing a plurality of arrangements such as that of FIG. 11, each having its mobile station PRS generator 1122 arranged to generate the code appropriate to the mobile station signal to be demodulated. Since the codes are orthogonal, only the desired signal will be demodulated into a coherent signal at the outputs of mixers 1032 and 1034 (FIG. 11), and other burst signals received concurrently will not result in coherent demodulated signal at the outputs of mixers 1032 and 1034.

Other embodiments of the invention will be apparent to those skilled in the art. For example, instead of using an antenna and a diplexer for connecting to a transmitter and receiver at each site, the transmitter and receiver may each be connected to a separate antenna. It has been assumed that the chip clocks of the master, mobile and masking transmitter-receivers are at the same frequency, and that count-down crystal controlled sources provide adequate accuracy, but if desired the master station may additionally transmit signals to the masking (or mobile) stations signals for control of the chip clock frequency to make the masking and mobile chip clock rates more nearly equal. The mobile station may be arranged to monitor the presence of the masking station transmission and to shut off mobile station transmissions automatically in the event that the masking station signals are interrupted. While amplitude controller 860 (FIG. 8) is arranged to maintain a predetermined ratio between the amplitude of the received mobile and masking station signals, the BER may be analyzed by data decision processor 040 (FIGS. 10, 11) and the amplitude control signal may instead be produced thereby to maintain a particular BER, such as $10^{-5}$, or the like. Furthermore, all processing functions have been described in terms of coherent IF signal manipulations. Functionally, the same results may be obtained by resolving all IF signals into I and Q baseband signals. All processing functions may then be carried out with digital signal processors. The amplitude increment $A_i$ by which the amplitude of the replica of the masking signal produced on conductor 53 (FIG. 8) is adjusted during each adjustment iteration is constant, as discussed in FIG. 9, but could also be changed in magnitude as a function of iteration.

What is claimed is:

1. A method for masking the transmission of data, comprising:

phase-modulating a first pseudorandom sequence with said data to produce a phase-modulated PRS signal, said first pseudorandom sequence having a first chip rate;

modulating first carrier signal by means of said phase-modulated PRS signal to produce first modulated carrier signal having a first frequency characteristic;

transmitting said first modulated carrier signal from a first site to produce a transmitted first signal, which it is desired to mask;

generating a second pseudorandom sequence;

modulating second carrier signal by means of said second pseudorandom sequence to produce second modulated carrier signal having approximately said first frequency characteristic;

transmitting said second modulated carrier signal from a second site to produce a transmitted masking signal;

receiving at a third site a combination of signals including said transmitted first signal and said transmitted masking signal, processing said combination of signals to generate an ensemble signal including at least a representation of said phase-modulated PRS signal and said second pseudorandom sequence;

at said third site, generating a replica of said second pseudorandom sequence;

phase controlling said replica of said second pseudorandom sequence to substantially equal the phase of said second pseudorandom sequence contained in said ensemble signal to produce a controlled second PRS signal;

subtracting a signal including at least said controlled second PRS signal from said ensemble signal to produce a residue signal including at least a representation of said phase-modulated PRS signal; and processing said residue signal using a replica of said first pseudorandom signal to obtain said data.

2. A method according to claim 1 wherein said chip rate of said second pseudorandom sequence is selectable, and further including the step of selecting said chip rate of said second pseudorandom sequence to equal said first chip rate.

3. A method according to claim 1 further comprising the steps of:

monitoring the amplitudes of said transmitted first signal and of said transmitted masking signal, and generating an amplitude control signal representative of the relative amplitudes of said transmitted first and masking signals; and controlling the amplitude of said transmitted first signal at said first site in response to said amplitude control signal.

4. A method according to claim 1 further comprising the steps of:

monitoring the amplitudes of said transmitted first signal and of said transmitted masking signal, and generating an amplitude control signal representative of the relative amplitudes of said transmitted first and masking signals; and controlling the amplitude of said masking transmitted signal at said second site in response to said amplitude control signal.

5. A method according to claim 1 wherein said step of phase controlling said replica of said second pseudorandom sequence comprises the steps of:

selectively delaying said replica of said second pseudorandom sequence to produce a selectively delayed second pseudorandom sequence;

cross-correlating said selectively delayed second pseudorandom sequence with said ensemble signal to produce correlation-representative signal; and controlling said selectively delaying step in response to said correlation-representative signal.

6. A method according to claim 1 wherein:

said step of processing said combination of signals comprises the step of down-converting to produce said ensemble signal at an intermediate frequency; and said subtracting step includes the step of modulating an intermediate-frequency oscillator using said controlled second PRS signal to produce an IF signal phase-modulated by said controlled second PRS signal.

7. A method according to claim 6 wherein said subtracting step further comprises the step of phase controlling said IF signal phase-modulated by said controlled second PRS signal to tend to minimize said residue signal.

8. A method according to claim 6 wherein said subtracting step comprises the step of amplitude controlling said IF signal phase-modulated by said controlled second PRS signal to tend to minimize said residue signal.

9. A method according to claim 7 wherein said step of processing said residue signal comprises the steps of:

generating said replica of said first pseudorandom signal;

controllably delaying said replica of said first pseudorandom signal to produce a delayed replica first PRS signal;

cross-correlating said delayed replica first PRS signal with said residue signal to produce a correlation-representative signal; and controlling said controllably delaying step in response to said correlation-representative signal.

10. A method according to claim 9 wherein:

said step of processing said residue signal further comprises the step of modulating an IF-frequency signal by means of said delayed replica first PRS signal; and said step of cross-correlating said delayed replica first PRS signal with said residue signal is performed at least in part at said IF frequency.

11. A master station apparatus for receiving, from a remote first transmitter, data signals modulated onto a first pseudorandom sequence transmitted at a first carrier frequency in the presence of masking pseudorandom sequence signals also substantially at said first carrier frequency, comprising:

receiving means for receiving said data signals and said masking signals at said first carrier frequency and for downconverting to produce an ensemble signal including said first and masking pseudorandom sequences;

generating means for generating a replica of said masking pseudorandom sequence which may not be in a particular phase relationship with said masking pseudorandom sequence included within said ensemble signal;

phase control means coupled to said generating means and to said receiving means for controlling the phase of said replica of said masking pseudorandom sequence to correspond to the phase of said masking pseudorandom sequence included within said ensemble signal, thereby producing phase controlled masking PRS signals;

subtracting means coupled to said receiving means and to said phase control means for subtracting from said ensemble signal a cancelling signal including said phase controlled masking PRS signals to produce residue signals including said data signals modulated onto said first pseudorandom sequence; and data retrieval means coupled to said subtracting means for processing said data signals modulated onto said first pseudorandom sequence contained in said residue signals to extract data from said data signals.

12. Apparatus according to claim 11 wherein said data retrieval means further comprises:

second generating means for generating a replica of said first pseudorandom sequence which may not be in a particular phase relationship with the first pseudorandom signal component of said residue signal;

second phase control means coupled to said second generating means and to said subtracting means for controlling the phase of said replica of said first pseudorandom sequence to equal the phase of said first pseudorandom sequence component of said residue signal, thereby producing phase controlled first PRS signals; and means for multiplying at least portions of said residue signals by a signal including said phase controlled first PRS signals.

13. Apparatus according to claim 12, wherein said second phase control means comprises:

controllable delay means coupled to said second generating means for delaying said replica of said first pseudorandom sequence in response to signals applied to a phase control input terminal for generating selectively delayed first pseudorandom signal;

correlating means coupled to said controllable delay means and to said subtracting means for correlating said selectively delayed first pseudorandom signal with said residue signal for generating a correlation-representative signal, the amplitude of which depends upon the delay selected by said controllable delay means; and control means coupled to said correlating means and to said controllable delay means for applying a control signal to said phase control input terminal of said controllable delay means for controlling the delay of said replica of said first pseudorandom sequence in a manner tends to maximize the correlation represented by said correlation-representative signal.

14. Apparatus according to claim 13 further comprising:

first memory means coupled to said subtracting means for receiving said residue signal; and signal presence sensing means coupled to said subtracting means and to said first memory means for causing said first memory means to temporarily store said residue signal.

15. Apparatus according to claim 14 further comprising:

time establishing means;

second memory means coupled to said time establishing means and to said signal presence sensing means for storing information relating to the time at which said signal presence sensing means indicates that said first memory means is to begin storing said residue signal.

* * * * *